United States Patent
Bereciartua-Perez et al.

(10) Patent No.: US 12,307,645 B2
(45) Date of Patent: May 20, 2025

(54) QUANTIFYING BIOTIC DAMAGE ON PLANTS, BY SEPARATING PLANT-IMAGES AND SUBSEQUENTLY OPERATING A CONVOLUTIONAL NEURAL NETWORK

(71) Applicant: BASF SE, Ludwigshafen am Rhein (DE)

(72) Inventors: Aranzazu Bereciartua-Perez, Derio (ES); Artzai Picon Ruiz, Derio (ES); Corinna Maria Spangler, Ludwigshafen (DE); Christian Klukas, Limburgerhof (DE); Till Eggers, Ludwigshafen (DE); Ramon Navarra-Mestre, Limburgerhof (DE); Jone Echazarra Huguet, Derio (ES)

(73) Assignee: BASF SE, Ludwigshafen am Rhein (DE)

(*) Notice: Subject to any disclaimer, the term of this patent is extended or adjusted under 35 U.S.C. 154(b) by 310 days.

(21) Appl. No.: 17/802,590

(22) PCT Filed: Mar. 5, 2021

(86) PCT No.: PCT/EP2021/055645
§ 371 (c)(1),
(2) Date: Aug. 26, 2022

(87) PCT Pub. No.: WO2021/176081
PCT Pub. Date: Sep. 10, 2021

(65) Prior Publication Data
US 2023/0141945 A1 May 11, 2023

(30) Foreign Application Priority Data
Mar. 6, 2020 (EP) .................................... 20161529

(51) Int. Cl.
*G06T 7/00* (2017.01)
*G06Q 50/02* (2024.01)
(Continued)

(52) U.S. Cl.
CPC ............ *G06T 7/0004* (2013.01); *G06Q 50/02* (2013.01); *G06T 7/13* (2017.01); *G06V 10/82* (2022.01);
(Continued)

(58) Field of Classification Search
CPC ..................... G06T 7/0004; G06T 7/13; G06T 2207/10024; G06T 2207/30188;
(Continued)

(56) References Cited

U.S. PATENT DOCUMENTS

2019/0362146 A1* 11/2019 Polzounov ................ G06T 7/10
2019/0377946 A1   12/2019 Genty et al.
(Continued)

OTHER PUBLICATIONS

Vaishnnave et al ("Detection and classification of groundnut leaf diseases using KNN classifier." In 2019 IEEE International Conference on System, Computation, Automation and Networking (ICSCAN), pp. 1-5. IEEE, 2019.).*
(Continued)

*Primary Examiner* — Wassim Mahrouka
(74) *Attorney, Agent, or Firm* — ArentFox Schiff LLP

(57) ABSTRACT

In performing a computer-implemented method to quantify biotic damage in leaves of crop-plants, the computer receives a plant-image (410) showing a crop-plant, showing the aerial part of the plant, with stem, branches, and leaves and showing the ground on that the plant is placed. A segmenter module obtains a segmented plant-image being a contiguous set of pixels that shows in a contour (460A) of the aerial part, the contour (460A) having a margin region (458) that shows the ground partially. The computer uses
(Continued)

convolutional neural network that processing the segmented plant-image by regression to obtain a damage degree, the convolutional neural network having been trained by processing damage-annotated segmented plant-images.

10 Claims, 14 Drawing Sheets

(51) Int. Cl.
  *G06T 7/13* (2017.01)
  *G06V 10/82* (2022.01)
(52) U.S. Cl.
  CPC .............. *G06T 2207/10024* (2013.01); *G06T 2207/30188* (2013.01)
(58) Field of Classification Search
  CPC ........... G06T 2207/20081; G06T 2207/20084; G06Q 50/02; G06V 10/82; G06V 20/10
  See application file for complete search history.

(56) References Cited

U.S. PATENT DOCUMENTS

2020/0012852 A1*  1/2020  Ding ...................... G06V 20/00
2021/0209747 A1*  7/2021  Jung ..................... G06T 7/0004

OTHER PUBLICATIONS

Hitimana et al. ("Automatic estimation of live coffee leaf infection based on image processing techniques." arXiv preprint arXiv:1402.5805 (2014)).*
International Search Report and Written Opinion of International Application No. PCT/EP2021/055645 mailed Jun. 1, 2021, 9 pgs.
Giriraja et al., "Plant health analyser", 2017 International Conference on Advance in Computing, Communications and Informatics (ICACCI), IEEE, Sep. 13, 2017, 5 pgs.
European Search Report of Application No. 20161529.1-1210 dated Aug. 7, 2020, 8 pgs.
Ubbens, Jordan R et al.: "Deep Plant Phenomics: A Deep Learning Platform for Complex Plant Phenotyping Tasks", Frontiers in Plant Science, vol. 8, Jul. 7, 2017 (Jul. 7, 2017), 11 pages, XP093045478, DOI: 10.3389/fpls.2017.01190.

* cited by examiner

460C

QUANTIFYING BIOTIC DAMAGE ON PLANTS, BY SEPARATING PLANT-IMAGES AND SUBSEQUENTLY OPERATING A CONVOLUTIONAL NEURAL NETWORK

CROSS-REFERENCE TO RELATED APPLICATIONS

This application is a national stage entry under 35 U.S.C. § 371 of International Application No. PCT/EP2021/055645, filed on Mar. 5, 2021, which claims the benefit of priority of European Application No. 20161529.1, filed on Mar. 6, 2020, the disclosures of which are hereby incorporated by reference herein in their entireties.

TECHNICAL FIELD

The disclosure generally relates to image processing by computers, and more in particular relates to techniques for quantifying biotic damages on plants.

BACKGROUND

Crop-plants are plants to be consumed by humans (or by animals). The damage to the plants—especially biotic damage—should be minimized. This is especially relevant while the crop-plant is still growing on the field. Quantifying the damage is a pre-condition for the farmer to apply a suitable measure that limits the damage.

More in detail, experts in plant pathology are familiar with diseases in plants caused by pathogens (infectious organisms) and environmental conditions (physiological factors). Much simplified and to point out only one aspect of many aspects: as the plants have leaves, biotic damage can be detected by visually inspecting the plant leaves.

The damages can have different reasons. For example, feeding damages are damages by pest animals (among them some insect species) that eat parts of the leaves. Bacteria or fungi damages are examples of damages in the cellular structure of the leaf. The overall term "necrosis" for cell damages is just mentioned.

The damages change the visual appearance of the leaves, usually in their color. Feeding damages are visible as insects sitting on the leaves, or as holes or cut-away parts of the leaves. Structural changes can change the color of the leaves, at least partially. There might be other, more complex reasons. For example, a mouse may eat from the root so that the leaves lose their "green" color.

The farmers can apply a suitable pest control measure or can apply other countermeasures: such as applying specific chemicals (i.e., agricultural compounds such as insecticides, bactericides, fungicides). The efficiency of the measures is related to the quantity of the damage, to the quantity of the chemicals, as well as to the accuracy and the time it takes to quantify the damage. However, different farmers may quantify damages differently.

The farmers can operate cameras (in mobile devices and the like) to take plant-images. Image processing tools play an important role in assisting the farmers.

However, the real-world conditions to take plant-images are typically far away from optimal: in real field conditions, the farmers may take the images, for example, by non-focused smartphones under poor illumination conditions.

While the conditions are difficult to change, there is a task for the image processing tools to compensate for such and other insufficiencies. In other words, there is a desire to estimate damage as objectively as possible and as repeatable as possible.

US 2019/0377946 A1 explains a plant-optimization system for indoor farming that processes plant images by a deep learning model and derives control signals to adjust the light provided to the plants and other environmental factors.

SUMMARY

According to embodiments of the present invention, a computer is adapted to quantify biotic damage in crop-plants. The computer performs a computer-implemented method that comprises to receive images of the crop-plant, or plant-images, and to provide damage quantity indicators, or damage degrees. By using these indicators, the farmer can apply measures accordingly.

As the plant-images are taken non-intrusively to the plants, the computer is adapted to quantify damage for the part of the plant that is located above the soil. Damages to the root are not on the plant-image and therefore ignored.

This above-soil part comprises the stem, the branches growing from the stem, and the leaves growing from the branches. As the crop-plants are land plants (with roots), the stem/branch/leaf part is referred to as "aerial part of the plant", or "aerial part" in short.

Not all plants have branches. The aerial part comprises multiple leaves, and two-digit numbers of leaves can be expected.

The computer provides the damage in the granularity of the damage-per-plant. The computer segments the plant-image in a first step sequence, and obtains the damage by processing the segmented plant-image in a second step sequence.

The computer-implemented method takes advantage of the following observation: In a first aspect, damages occur on the leaves, but not to the same extend on the stem and the branches of the plant. The damage-per-plant is quantified by one or more numeric values that can assist the farmer to apply the measures accordingly. In a second aspect, damaged parts change their color at non-uniform rate. Leaves go from "green" to "not-green" faster than the stem and the branches. This aspect is used in processing plant-images: the "green" parts of the image indicate the leaves that belong to the same plant, even if the color of the damaged leaves has started to lose their "green" color.

Plant-images may not show a particular aerial part alone, but may show leaves from neighboring plants, or show leaves one the ground that are no longer attached to a plant (or no longer associated with the plant). The images may also show the ground (or soil) and even objects that accidentally appear on the image (such as human hands).

In the first step sequence, the segmenting sequence, the computer therefore processes the plant-image by splitting out the portions that do not belong to the plant. It does not matter whether these other portions show damage or not, they are not to be considered. More in detail, the computer receives the plant-image (showing the crop-plant as input) and identifies a contiguous subset of pixels, the contour. The contour has irregular shape. As computers usually process images as arrays (i.e., rectangles, squares), the contour (i.e., the pixels within a contour-line) and to-be-ignored pixels are embedded into a segmented plant-image being a preliminary result.

In the first step sequence, the computer processes the plant-image from a single plant, identifies the above-soil portion (i.e., stem, branches. leaves) and provides a segmented plant-image that shows the contour, at least in an approximation. This first step sequence applies color pre-processing. The computer differentiates the pixel colors of the plant-image, and—simplified—takes over the "green" pixels and disregards other pixels. The "green" pixels form a contiguous set of pixels and the computer enlarges this set to include pixels that may show damage but that are not "green" pixels.

While the contour may show objects that the CNN may count as contributing to the damage-per-plant, the share of the margin in relation to the plant on the image is minimal, hence the contribution to damage-per-leaf (if any) is minimal as well.

Having the contour is a compromise between letting the computer identify the exact borders of multiple leaves (with a relatively large number of pixels) and not identifying non-portion parts at all. The contour region does not stop at the edge of the leaves. A margin line (with pixels) keeps a distance to the leaves. As a result, the number of pixels that limit the contour (in a margin line) is lower than for a line that would exactly follows the leaves (cf. the coastline paradox). Using a margin line with the distance may be advantageous in terms of saving computing resources.

In the second step sequence, the damage estimating sequence, the computer operates a CNN with the segmented plant-image as input and with the damage degree as output. The computer applies regression techniques and outputs the damage degree as the relation between the damaged area to the overall area of the plant (that is shown on the contour). There is no need to identify the pixels that show the damage.

The damage can be quantified otherwise, such as the number of damage dots, or the number of damage dot clusters.

Both sequences are optimized for a plant-image for that the camera takes the plant-image in view-from-above. In other words, the camera is located in zenithal orientation to the plant.

From that camera position, the area of the stem (pixels on the image) is minimized and the areas of the leaves (pixels as well) is maximized. The pixels showing leaves, branches and stem are contiguous. While such a camera takes the image of the plant by stem, branches and leaves, it also captures the ground (at least partially, the ground that is not hidden by leaves or the like). There is no damage to be quantified on the ground, but the ground may have a surface that may appear similar to the surface of a damage leaf (noisy background). The camera can take the image over a ground that has a non-plant color (e.g., blue). The computer will then pre-process the images to filter out pixels with that color.

As a condition, the computer has been trained with training data sets. Appropriate training is available for the computers for that damages values have been annotated.

DETAILED DESCRIPTION

Overview

Figure 1:
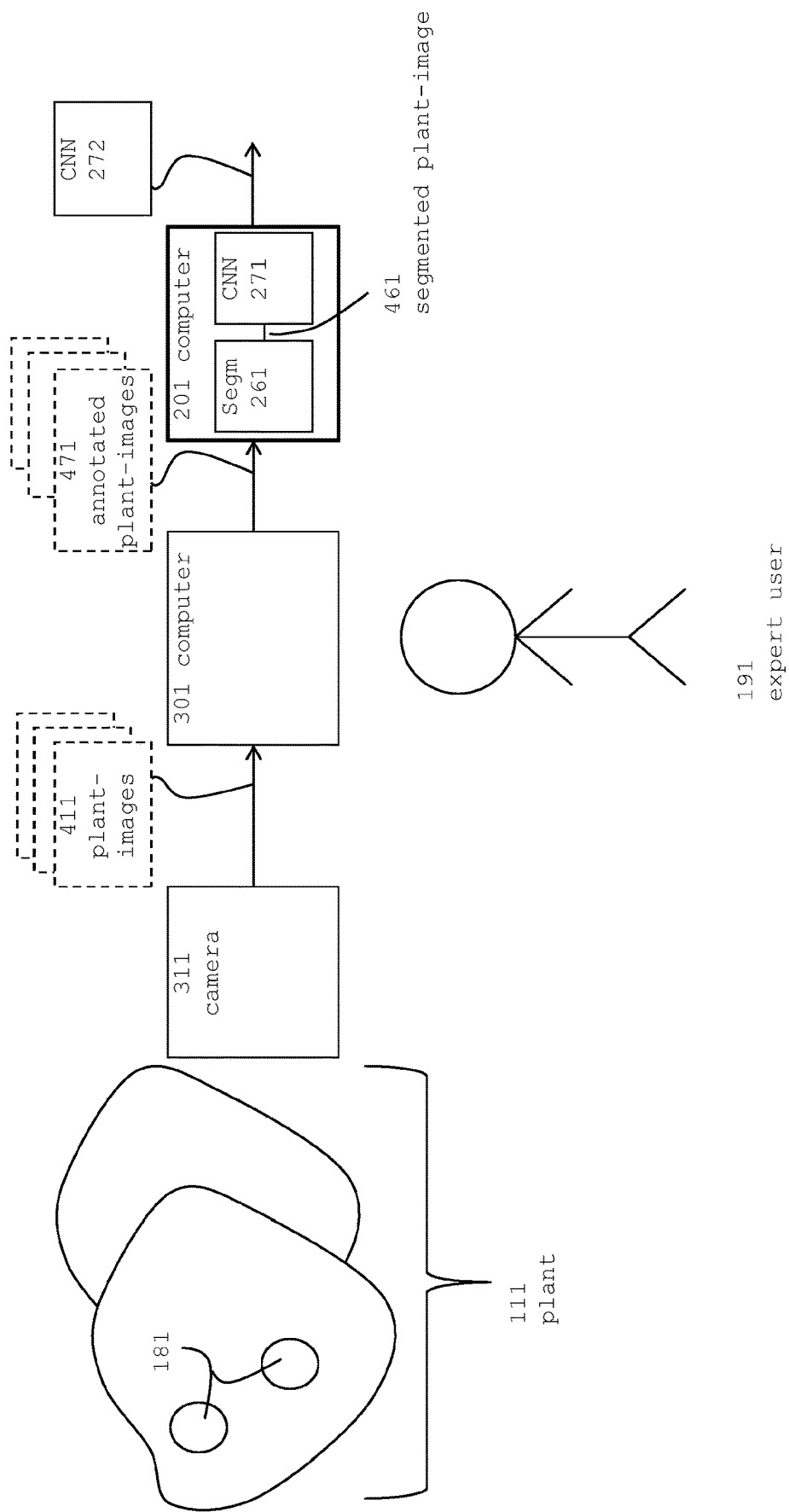
FIG. 1 illustrates an overview to a computer-implemented approach to teach—in a training phase—a convolutional neural network (CNN) to obtain biotic damage values crop-plants.

The description starts by explaining some writing conventions and introduces step sequences from a high-level perspective (FIGS. 1-3) by differentiating a training phase (1) and a subsequent testing phase (2). The description then explains the plants and potential damages, images and image-processing, as well as damage calculation by a CNN (FIGS. 4-12). The description then provides further aspects of training phase 2 (FIG. 13). References without training/testing differentiation are given by 0.

Terminology Conventions

The term "image" stands for the data-structure of a digital photograph (i.e., a data-structure using a file format such as JPEG, TIFF, BMP, RAW or the like). Phrases like "the camera takes an image" stand for a camera with a viewing angle to capture an object (such as a plant) and storing the image. The description will explain details, such as the spatial arrangement of cameras and plants to each other. Taking images can be automated. There is no need for a human user to be present during that action.

The action "take an image" is followed by a number of standard actions, such as forwarding the image to a computer (via a network, via a memory unit or otherwise), receiving the image at the computer or at a module of the computer, storing the image by the computer and so on.

The description uses the term "show" when it explains the content of images (i.e., the semantics), for example in phrases such as "the image shows a plant". There is however no need that a human user looks at the image.

The description expresses computer-user interactions with the user looking at the image by the term "display", such as in "the computer displays a numeric value" or the like.

The term "annotation" stands for meta-data that a computer receives when an expert user looks at an image on the display of a computer and interacts with the computer to enter data. The term "annotated image" indicates the availability of such meta-data for an image (or for a sub-region of that image), but there is no need to store the meta-data and the image in the same data-structure. The annotations are meta-data and there is no need to embed them into the data-structure of the image. The annotations can be associated with the image otherwise, for example, via database entries. The annotation can be a numeric value, such as a damage degree, that is assigned to a particular image.

The description uses the term "area" to identify the quantity of the surface of a plant or of its parts (the quantity, for example, in terms of square pixels). The description occasionally writes colors in quotation marks, such as for "green" leaves, indicating that nature offers plant in many different colors.

For convenience, the description refers to hardware components (such as computers, cameras, mobile devices, communication networks) in singular terms. However, implementations can use multiple components. For example, "the camera taking a plurality of images" comprises scenarios in that multiple cameras participate. Some images can be taken from a first camera, some image can be taken from a second camera and so on.

Some figures illustrate computers by rectangles with bold frames. The computers implement the step sequences, or methods. There is no need that the steps are all implemented by the same physical computer. User interfaces, databases and other well-known computer components may be omitted, for simplicity.

Human users are illustrated by different roles. The user can have the role of an expert (i.e., the person who conveys observations in form of annotations), of a farmer (i.e., the person who is responsible to observe the damage degree to apply suitable measures), and so on. The roles can be performed by different persons.

Overview to Training and Testing Phases

Figure 2:
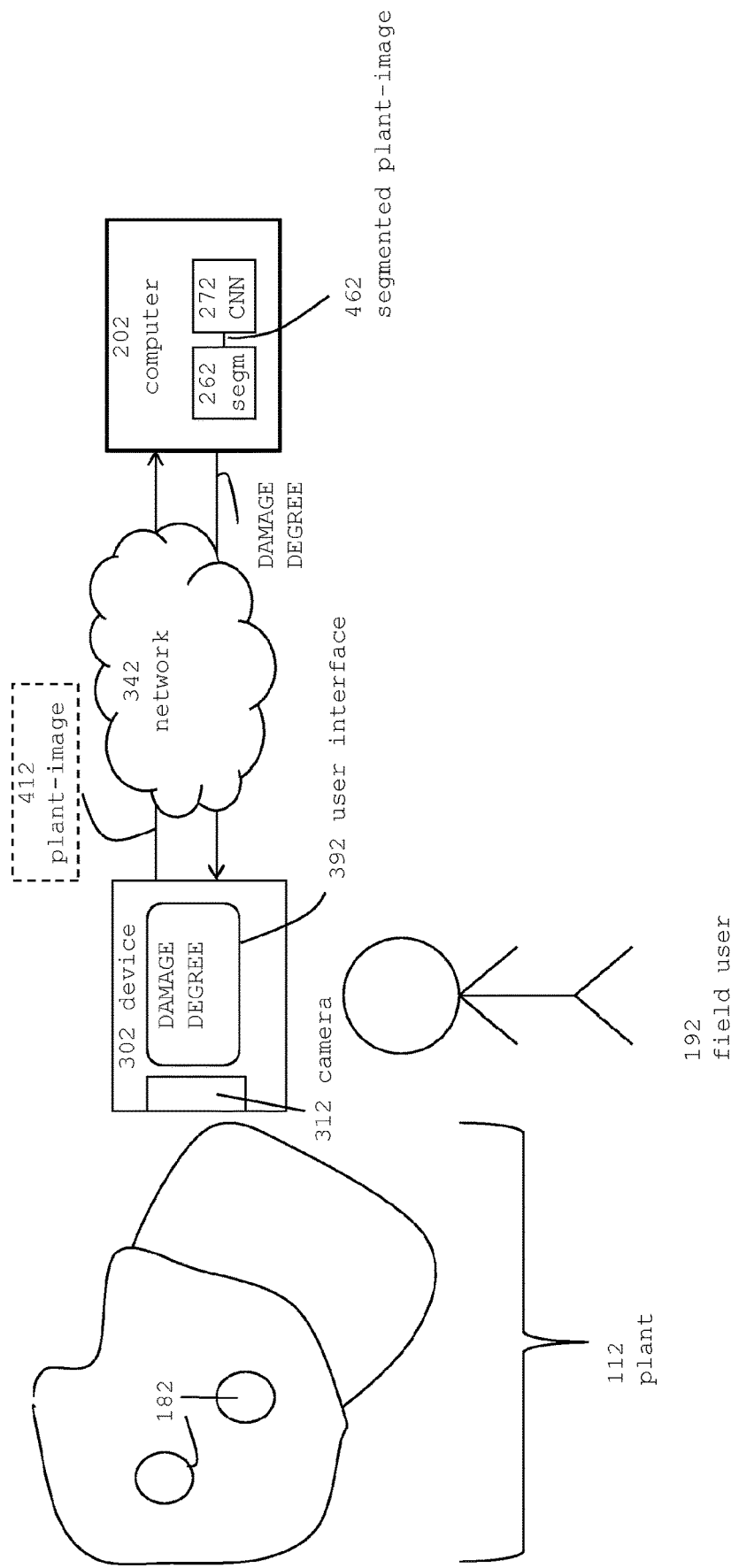
FIG. 2 illustrates an overview to a computer-implemented approach to quantify the biotic damage in a testing phase, with the damage value at the output of the CNN.
Figure 3:
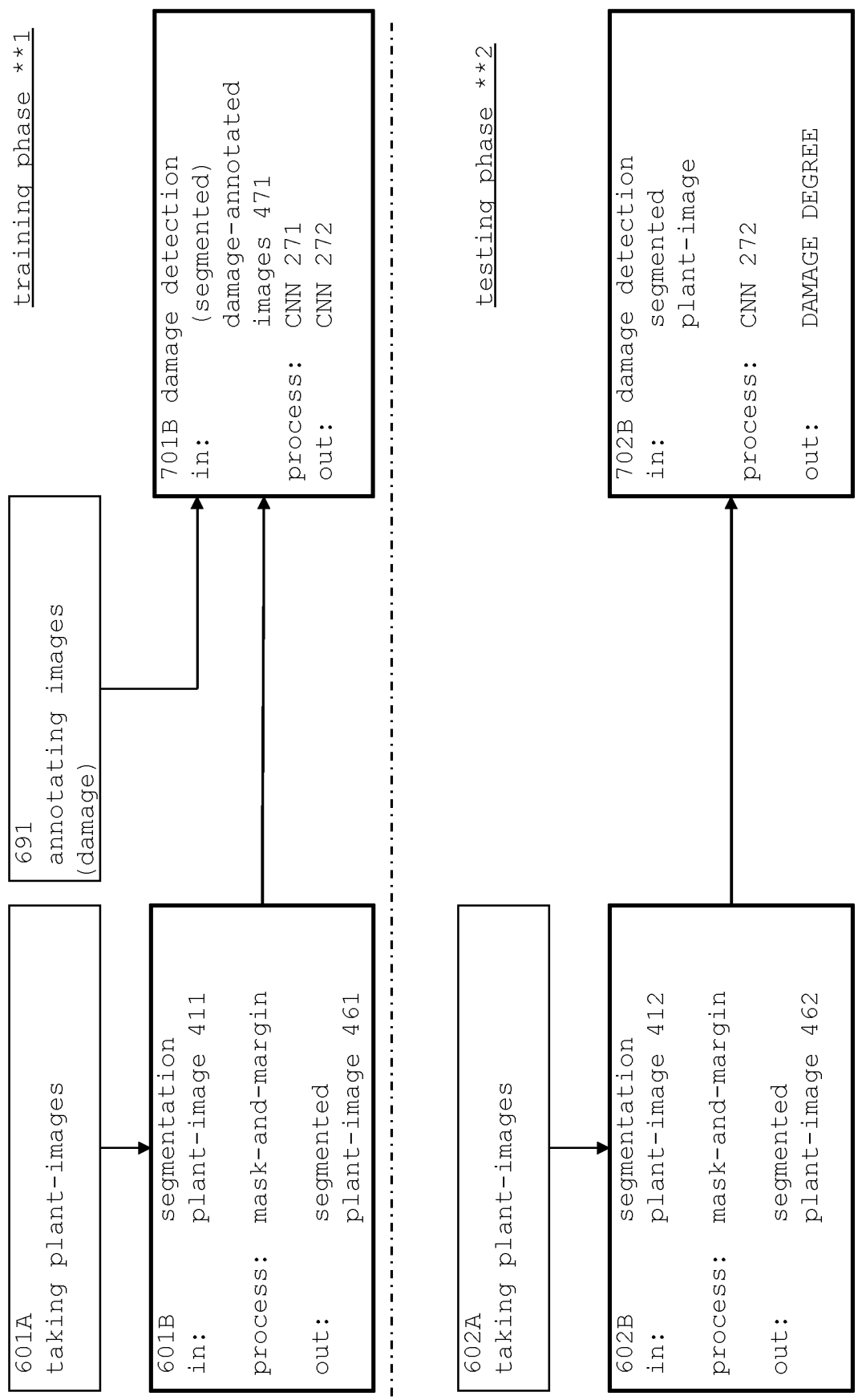
FIG. 3 illustrates an overview to computer-implemented methods.

FIGS. 1-3 illustrate an overview to computer-implemented approaches, with a computer-implemented method 602B/702B to quantify biotic damage in crop-plants 112.

From left to right, FIGS. 1-2 illustrate plants 111/112 (the aerial part, with damages 181/182), cameras 311/312 that take plant-images 411/412 and computers 201/202 that perform method steps.

Computers 201/202 apply machine learning (ML) techniques. More in detail, computer 202 uses convolutional neural network 272 (CNN 272) to provide a damage degree, as in FIG. 3 (right side below). CNN 271/272 may have an architecture based on ResNet18 (He, K., Zhang, X., Ren, S., Sun, J., 2015. Deep Residual Learning for Image Recognition. doi:10.1109/CVPR.2016.90).

The computer can make the damage degree available to (the role of) field user 192, for example, by displaying the degree on mobile device 302 (FIG. 2).

But before computer 202 can use CNN 272, other activities have to be performed:

In both phases 1/2, cameras 311/312 take plant-images 411/412. FIG. 3 illustrates this by boxes 601A/602A. Taking plant-images can be automated.

In training phase **1 only, a person in an expert role—such as expert user 191—annotates plant-images 411 to obtain annotated plant-images 471. FIG. 3 illustrates this by box 691. The expert does not have to look at the plant-image. Instead, expert user 191 can visually inspect plant 111. The annotations are damage annotations in form of numeric values per image that are assigned to each plant 111 (and therefore to each plant-image 411). The annotations can indicate a damage share (i.e., a relation between damaged part of the leave and the leaves as a whole). As illustrated in FIG. 1, expert user 191 can provide the annotations by interacting with computer 301 (e.g., a portable computer that the expert carries to the field).

In both phases 1 and 2, computer 201/202 segments plant-images 411/412 to segmented-plant-images 461/462. FIGS. 1-2 symbolized the segmentation by segmenter modules 261/262 that belong to computers 201/202. FIG. 3 symbolizes the segmentation by sequences 601B and 602B. Segmentation uses a mask-and-margin approach and will be explained below.

In phase 1, CNN 271 is being trained to become CNN 272. It is enabled to obtain biotic damage values in crop-plants, the difference between untrained CNN 271 and trained CNN 272 is the availability of parameters obtained through training. Training is illustrated by method 701B, and the expert can annotate segmented-plant-images 461 from segmentation process 601B so that process 701B damage detection can be performed with such training images. Process 601A and 601B are the same, and performed during phases 1 and **2, respectively.

Distribution of Computing Resources

FIG. 2 illustrates network 342 to communicate plant-image 412 from mobile device 302 to computer 202 and to communicate the damage degree back to mobile device 302. This refers to a typical usage scenario.

FIG. 2 illustrates mobile device 302 as a device that has camera 312 as an integral part and that has user interface 392 to display the damage degree. This combination of two functions into a single structure is convenient, but not required.

On the other hand, having distributed computing resources is convenient. In the example, CNN can be implemented by computer 201/202. Computer 201/202 has higher processing capacity than, for example, computer 301 (e.g., interacting to obtain the annotations) and computer 302 (e.g., the smartphone in the hand of the farmer).

Two Example Scenarios

The approach to quantify damage is applicable to at least two experimental scenarios of different damage-cause and damaged-plant combinations.

In the first scenario, plant 111/112 is an eggplant, and the damage is feeding damage by *thrips* (FRANOC). In the first scenario, damage is expected on both side of the leaf (front and back).

In the second scenario, plant 111/112 is a tomato, and the damage is feeding damage by *tuta* (GNORAB).

The uppercase acronyms are the so-called EPPO-codes (European and Mediterranean Plant Protection Organization).

All Phases

The description now explains aspects that are applicable for both phases, so that most of the following paragraphs and figures use the **0 notation.

Plant and Camera in Real-World Situations

Independently from the phases, a computer would quantify damage with highest accuracy if images (both for the training phase and for the testing phase) would be taken under repeatable conditions with high-performance camera equipment. However, there is no need to visit a photographic studio for taking high-quality photos of selected well-shaped and healthy plants.

In contrast, camera 310 takes the image (i.e., the photos) at locations that are typical for plants, such as in the field, in the green-house or the like. The description describes such a situation in the following.

Figure 4:
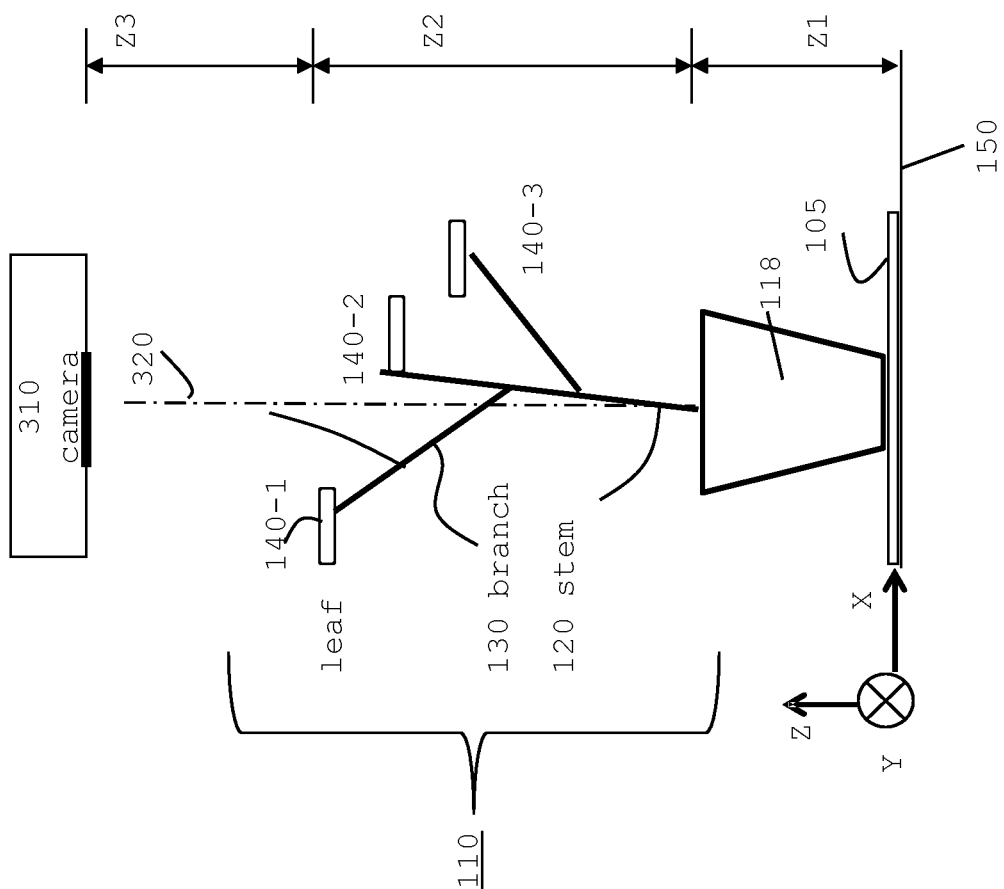
FIG. 4 illustrates a crop-plant and a camera in zenithal orientation to the plant.

FIG. 4 illustrates crop-plant 110 (cf. FIG. 2) and camera 310 in zenithal orientation to the plant (i.e. view from above orientation).

There will be a focus on attention to the surface of the leaves, but the figure conveniently illustrates plant 110 as a whole. As it will be explained, image processing comprises to selectively disregard some portions of the images (cf. step sequence 601B/602B component segmentation in FIG. 3).

FIG. 4 illustrates the plant in relation to a Cartesian location coordinate system (X, Y, Z). The XY-plane substantially corresponds to ground 150. Ground 150 can be the soil of an agricultural field or of greenhouse field (the soil being the substrate for the plant to grow). Ground 150 can also be the floor of a greenhouse (that does not serve as soil).

Plant 110 is illustrated with its aerial part: stem 120, branches 130, and a plurality of leaves 140-1, 140-2, 140-3 (Real plants have more leaves).

It is noted that plant 110 is being photographed in its growing position, that is in upright position. The images are taken non-intrusively to the plants.

As illustrated, the plant can be placed (with its root) in pot 118. Such placement can be applied when the plants are grown in greenhouses. In the example, pot 118 is a so-called conical frustum, but the shape does not matter. The pot diameter is conveniently defined as the diameter of the upper rim. Pot 118 is placed on ground 150 (i.e., the pot stands on the ground underneath the plant), and pot 118 comprises soil.

Heights can be differentiated as pot height Z1 and plant height Z2 (i.e. the length of the stem). Z3 is the plant-to-camera-distance in Z-direction. For scenarios without pot 118, the stem-root transition is at ground 150 and the value Z1 is zero.

Camera 310 is placed high above plant 110 (vertical position Z1+Z2+Z3) by a platform, by an aerial vehicle, by a holder at the greenhouse roof or the like. It is also possible that human users hold the cameras in their hands. The camera objective (symbolized by a bold line) is oriented to view down to the plant. It is noted that Z1+Z2+Z3 is shorter than the body size of most human operators so that camera 310 can easily be operated.

Camera 310 is the image acquisition devices for plant-images (cf. FIG. 3).

In zenithal view, optical axis 320 of camera 310 is oriented substantially perpendicular to the XY-plane. In other words, the angle between optical axis 320 and the XY-plane approximates to a 90 degree angle. However, taking tolerances into account, the angle could be between 60 and 90 degree.

Using the zenithal view, the XY-plane (of the arrangement) is substantially parallel to the sensor plane (at least for most cameras). Therefore, the pixels (in the image) are identified by pixel-coordinate that are noted (I, J), cf. FIG. 6.

Assuming that stem 120 rises in substantially vertical direction (as for most crops), optical axis 320 approximately coincides with stem 120.

Camera 310 can be differentiated into different types by camera properties, such as the number of pixels in the image sensors, aperture and focal length of the camera lens etc. For convenience, the types are differentiated according to manufacturers and pixel numbers: OLYMPUS 24M, NIKON 20M, SAMSUNG GALAXY A8 smartphone). Other types can be used as well.

Camera 310 may be a so-called off-the-shelf camera, there is no adaptation (or modification to the camera) required. Optical filters (at the objective) are not required.

However, non-studio environments create a number of constraint, such as the following:

The illumination (of plant 110 and/or the ground 150) may not be optimized to have images that show details of the leaves. Plant-images 410 may suffer from over-exposure or under-exposure. As the sun goes along its path and as the weather changes, the illumination changes during the day. (The farmer is not expected to visit the field when the illumination is best.)

The plant-to-camera-distance Z3 may be unpredictable. The user holds the camera in his/her hand, but different users have different statures. Cameras that are fixed (e.g., to the roof of the greenhouse), the distance Z3 changes when the plant grows.

The resolution is not necessarily with 24M, but can be smaller. For example, many cameras have options to set the image resolution to lower values (for example with option L for full resolution, options M and S for pixel-reduced resolutions).

Although some cameras use automatic focusing, there is no guarantee that all leaves are on focus. Unfocused images need to be expected.

Cameras (especially that of mobile devices, smartphones cf. device 302 in FIG. 2) may adjust camera settings and image processing to optimize images of persons, but the camera are not fine-tuned for taking plant-images.

User-operated cameras are usually not mounted on a tripod or the like. Shaking is expected.

The leaves may oscillate in the air.

The leaves are not necessarily arranged in the XY plane (that is orthogonal to the optical axis).

The optical axis of the camera may not sufficiently coincide with the stem (the user might be unable to hold the camera on top of the plant, the plant might be off standard.)

Images taken by camera 310 do not convey information regarding the plant height Z2. Images from different perspectives (e.g., looking at the stem from the side) are not available. Image processing must therefore rely on 2D images.

Leaves may have fallen from the plant to the ground, and such leaves would appear in a leaf color as well.

FIG. 4 also illustrates an optional item for that the function will be explained below. Ground 110 can be covered by sheet 105. There is no need to keep sheet 105 permanently, it can be placed to ground 150 just before operating camera 310 and can be removed thereafter. The thickness of sheet 105 (in Z-direction) can be neglected. As illustrated, pot 118 stands above sheet 105. In non-pot scenarios, sheet 105 is implemented by stripes or the like, so that sheet 105 does not interfere with the stem or root. The material of the sheet does not matter: paper, textile, etc. On the image, sheet 105 provides a background color that is different from the soil (or different from the floor) and different from the plant.

In implementations, this background color of the sheet is "blue" (or "gray"). The sheet color is selected to have highest contrast to the plant colors, and the contrast is color-space contrast.

Damages

Figure 5:
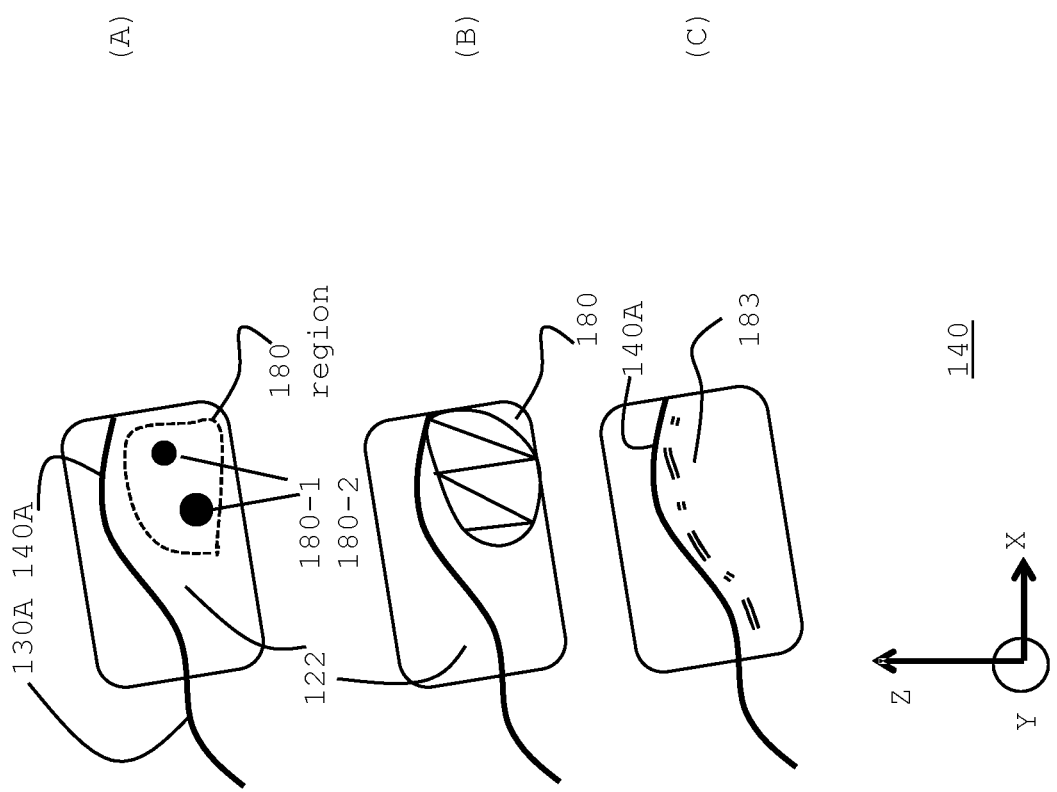
FIG. 5 illustrates damages on a leaf by way of example.

FIG. 5 illustrates damages on leaf 140 by way of example. For simplicity, the leaf is illustrated by a round-shaped rectangle. The bold line 140A symbolizes folds and nerves (of the leaf), and bold line 130B symbolizes a branch, cf. FIG. 4). There are versions, (A), (B) and (C), with a common XY-coordinate system.

Damages can be visible on the surface of the leaf, as dot-shaped variations on the surface color of the leaf. Much simplified, a non-damaged leaf has a surface that is substantially "green" everywhere, a damaged leaf has a surface that is still "green", but that shows "non-green" spots (or dots). In case of feeding damage, the holes would show up as "non-green" spots as well.

In the much simplified example of FIG. 5 version (A), leaf 140 is a damaged leaf with two damage dots 180-1 and 180-2. To symbolize size variations, the figure illustrates both dots by different sizes. In reality, most of the dots are not necessarily black (as in the figure), but rather in a "non-green" color. Damage region 180 is a cluster of dots (is a region on the leaf that has a relatively high concentration of damage dots). Damage dots are countable. In the simplified example there are just N=2 dots, but in reality there can be hundreds of dots in a single region (or on a single leaf). Damage regions are countable as well. In the example, there is a single region only. But regions are also measurable by their surface areas. In the example, damage region 180 occupies approximately a quarter of the surface area.

In the much simplified example of version (B), damage region 180 is a region in that the color differs from the rest of the leaf.

Reasons for the damage include feeding damage (insects have eaten part of the leaf, potentially the insects are still sitting on the leaf), disease damages, and others. Different reasons lead to different types of damages.

Leaves 140 and the damage regions 180 have areas (that can be measured, for example, in square millimeters or in square pixels).

Quantity Indicators for the Damage on the Plant

Damages are quantified by damage degrees (or damage quantity indicators). The pixels of plant-image 410 can be differentiated into plant-pixels that correspond to plant 110 (either for stem 120, branch 130 or leaf 140)

damage-pixels that correspond to damages 180, in a subset to the plant-pixels

Other pixels can be ignored. A damage ratio can be defined as the number of damage-pixels N_DAMAGE over the number of leaf-pixels: RATIO=N_DAMAGE/N_LEAF.

The description introducing the pixel numbers to illustrate the meaning of the damage degree, but individual damage-pixel do not have to be identified. It is sufficient for the computer to estimate the number.

Shortly returning to FIG. 2, the damage degree can be returned to field user 192 (in the function of being the farmer). Taking tolerances into account, the damage degree is conveniently presented by rounded numbers. For the farmer it can make a difference to understand, for example, that a particular plant shows a damage of 50 percent or of 20 percent.

Annotating plant-images to obtain a training set (annotated plant-image 471) comprises the assignment of visually estimated damages.

Front/Back

While FIG. 5 illustrates leaf 140 with its front side (the side that is usually oriented in Z-direction upwards, it is noted that damages can also occur on the back side of the leaf. The computer that processes the images does not necessarily have a priori data that differentiates the front side from the backside.

On the front side, the contrast between the "green" of the leaf and the "other color" of the damage is usually higher than on the back side.

Non-Damage Regions

FIG. 5 (C) illustrates the leaf again, but with shadow 183 next to fold 140A. The shadow is NOT a damage. Such shadows (or occlusions etc.) occur according to the relative directions between light and (optical axis of) camera.

Figure 14:
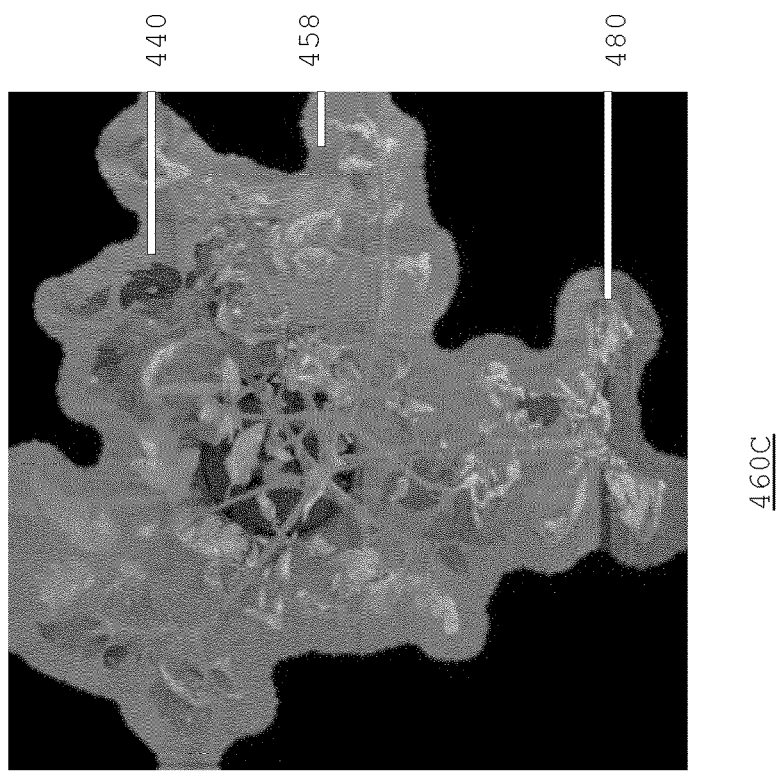
FIG. 14 illustrates photographs being real plant-images.
Figure 14:
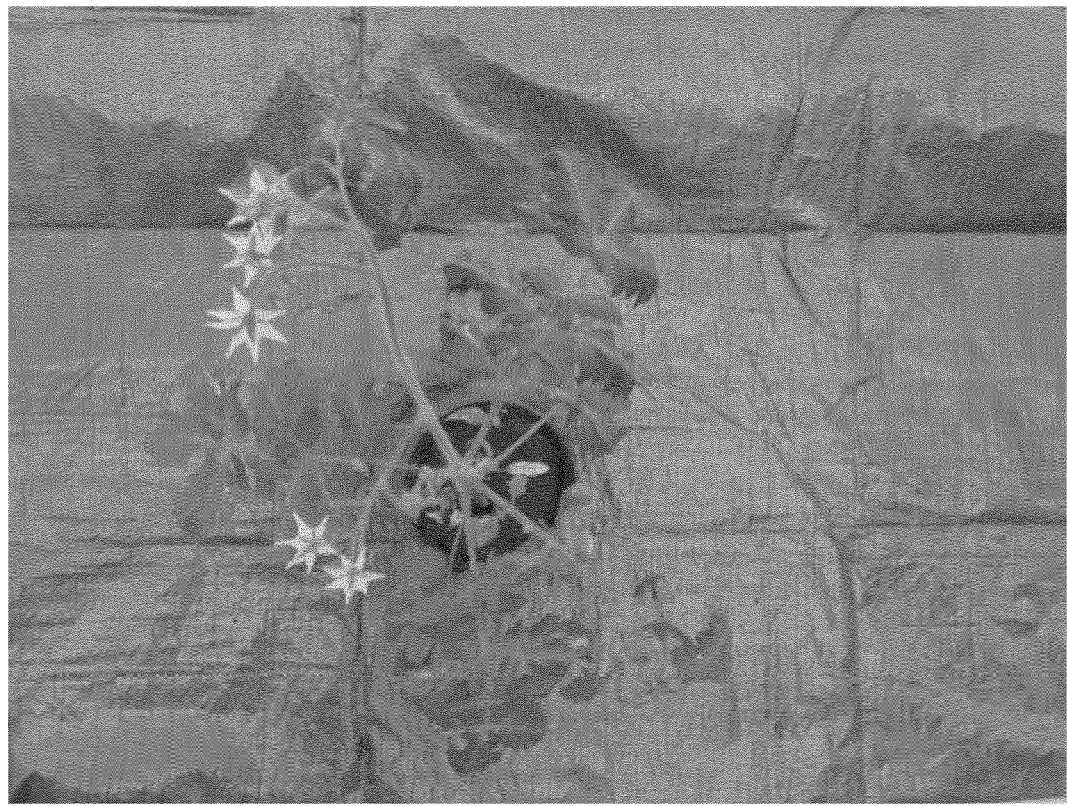
Figure 15:
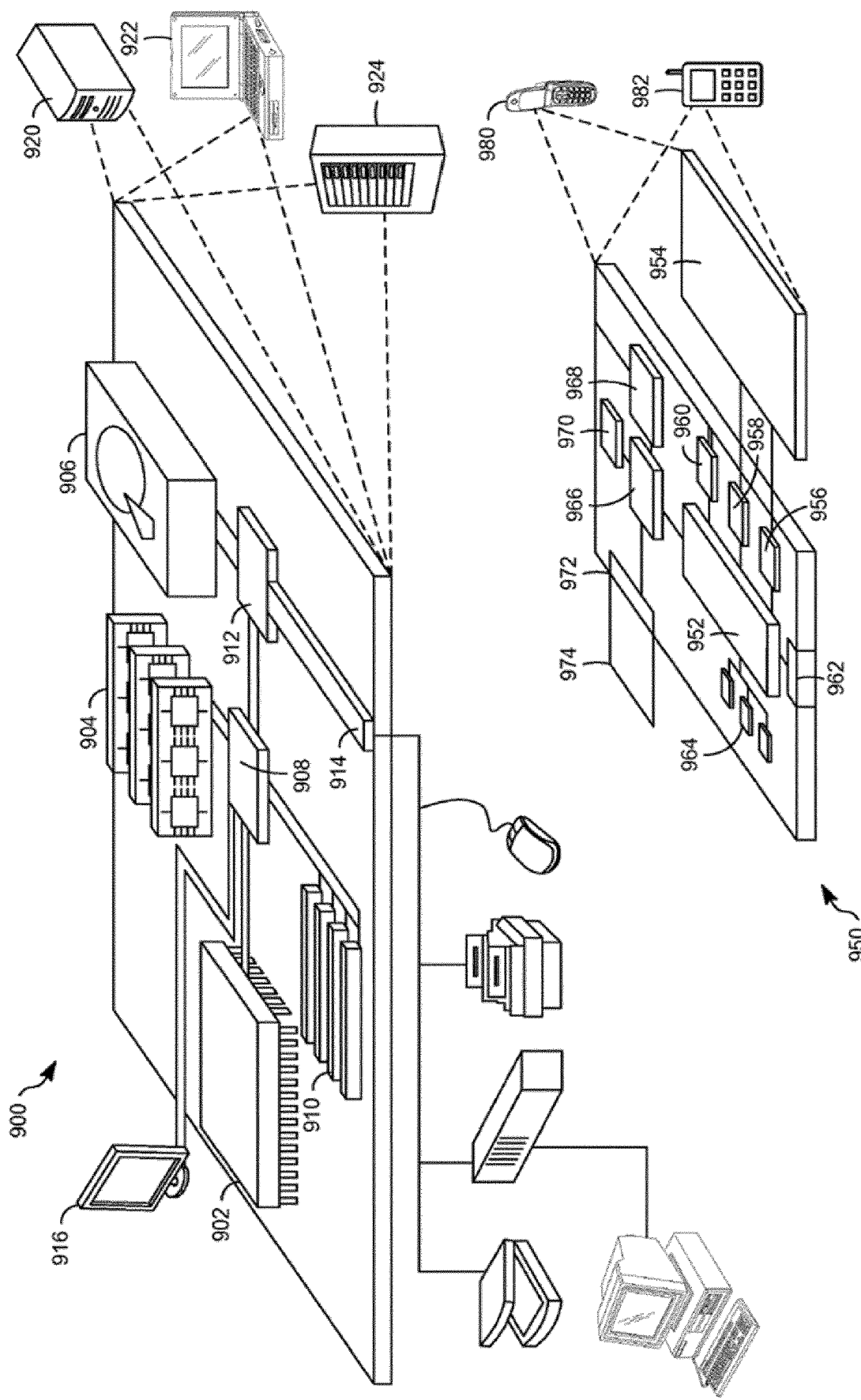
FIG. 15 illustrates as generic computer.

While FIGS. 14-15 illustrates plants and leaves, the images taken by the camera should show them as well. However, there are some points to look at.

Plant-Image

Figure 6:
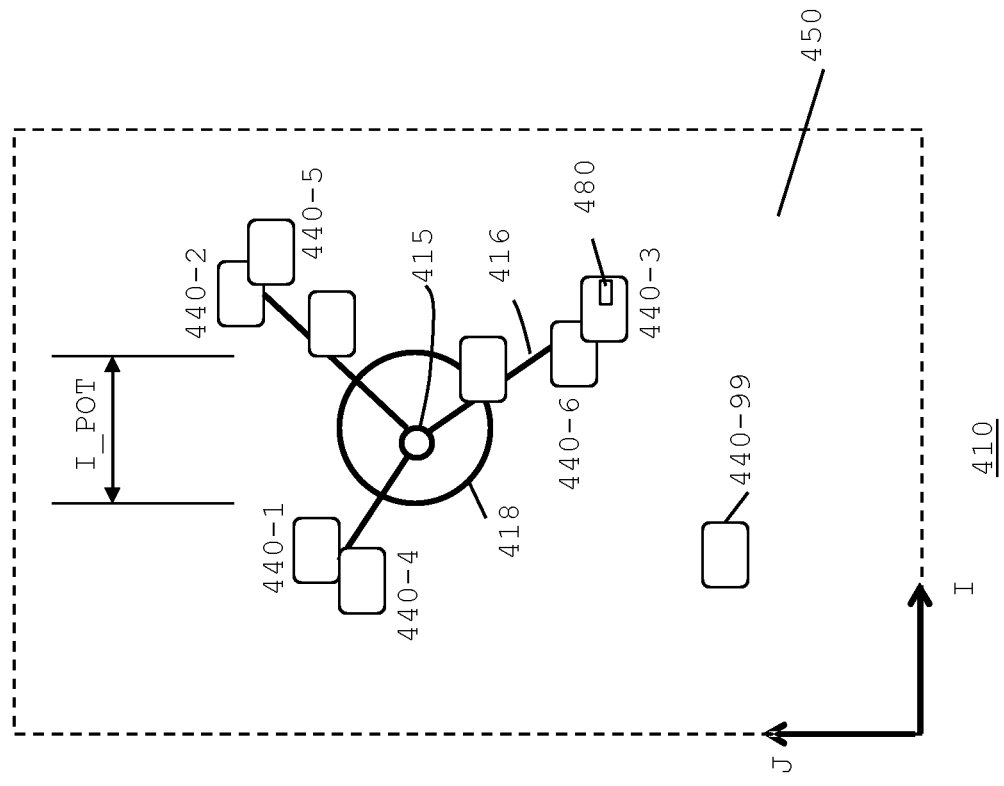
FIG. 6 illustrates a plant-image taken by a camera in zenithal orientation.

FIG. 6 illustrates plant-image 410 taken by camera 310 in zenithal orientation. In the example, plant-image 410 is taken by camera 310 of plant 110 (in the FIG. 4 arrangement). The coordinates (I, J) are pixel coordinates. Taking a camera with 24M pixels as an example, there are 4000 pixels in I-direction and 6000 pixels in J-direction. For explanation it is assumed that the (I, J) pixel coordinates can correspond to the (X, Y) location coordinates. However, it is not necessary that the camera is aligned to any location. This is also applicable to the optical axis. The figure illustrates plant-image 410 in portrait format, but the orientation does not matter. This is advantageous for cameras that are operated by human users: the user does not have to observe the orientation. In other words, field user 192 can operate camera 312 (cf. FIG. 2) just by placing the camera objective in zenithal orientation above the plant.

In view from above, plant-image 410 shows leaves 440, stem 420 and branches 430. Optionally it shows pot 418 (with a pixel diameter I_POT) and ground 450. Plant-image 410 also shows ground 450 that is optionally covered by the sheet.

Plant-image 410 does not show all leaves with the surfaces in full. For example, it shows entire leaf 440-1 next to adjacent leave 440-4, but only partially shows leaf 440-2 which is partly covered by leaf 440-3, and shows leaves 440-3 partly covering leaf 440-6.

Plant-image 410 shows damage 480 (cf. damage 181/182 in FIGS. 1-2). Plant-image 410 shows leaf 440-99 that has fallen to the ground. It does not matter if leaf 440-99 shows damage or not, in estimating the damage degree, the computer can ignore it (cf. FIG. 10 with an example). Ignoring or considering the fallen leaf can depend on pre-defined distances.

FIG. 6 is simplified by illustrating a plant-image as it is expected for many situations, it can be assumed that it has been taken by the camera arrangement of FIG. 4 and it can be assumed that plant-image 410 shows leaves 440 with their front sides (but 440-99 either side).

However, for reasons as explained already, the arrangement may not be ideal, as some of the leaves may be shown by the backside. The knowledge to differentiate both sides is not available.

However, plant-image 410 still shows elements that may disturb the calculation of the damages. It is therefore advantageous to segment plant-image 410 to segmented plant-image 460 (cf. FIGS. 10-12).

Since the segmentation takes advantage of transforming the color-coding (for the plant-image), the description takes a short excurse to discuss colors.

Figure 7:
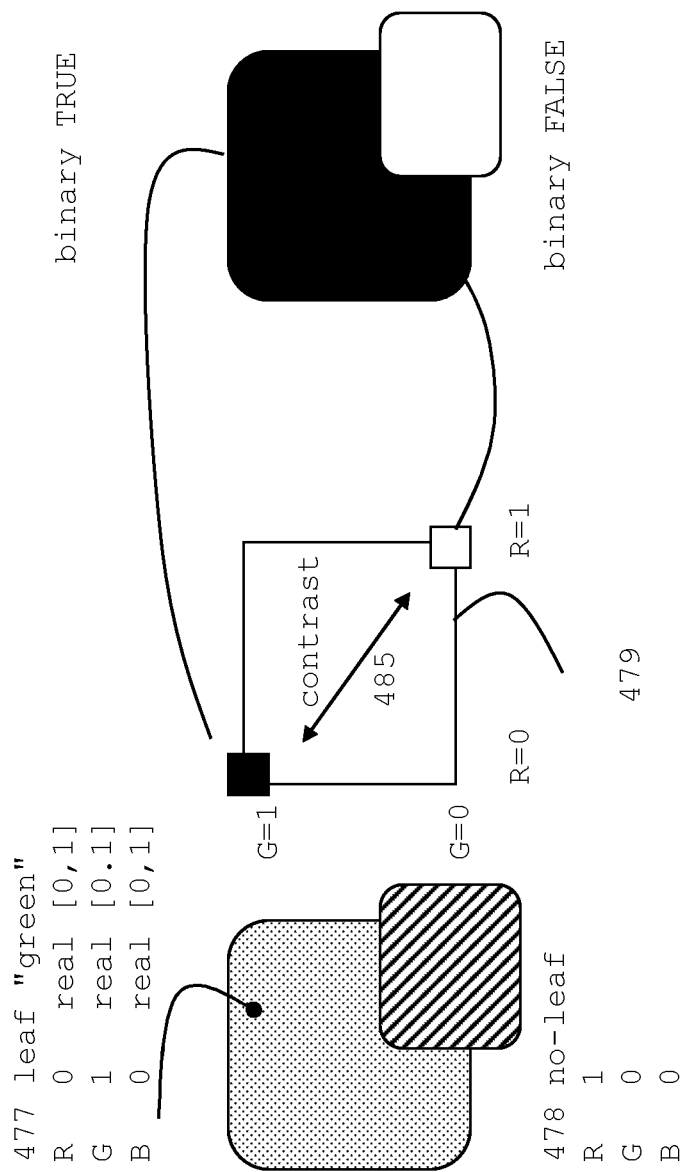
FIG. 7 illustrates the assignment of color-coded pixels to binary values.

FIG. 7 illustrates the assignment of color-coded pixels to binary values;

The figure shows two pixel regions 477 and 478 that are coded by a first color-coding, such as RGB. The camera provides images usually in such coding. The numbers in the closed interval [0, 1] are real numbers and indicate the quantity of Red, Green and Blue components. In the example, region 477 is coded R=0, G=1, and B=0; and region 478 is coded R=1, G=0, and B=0. Looking at the semantics, the regions can be differentiated into leaf region 477 ("green" color), and no-leaf region 478.

Color diagram 479 illustrates the contrast. Disregarding the component B, the contrast 485 can be used to assign binary values. Regions 477 and 478 are differentiated.

Figure 8:
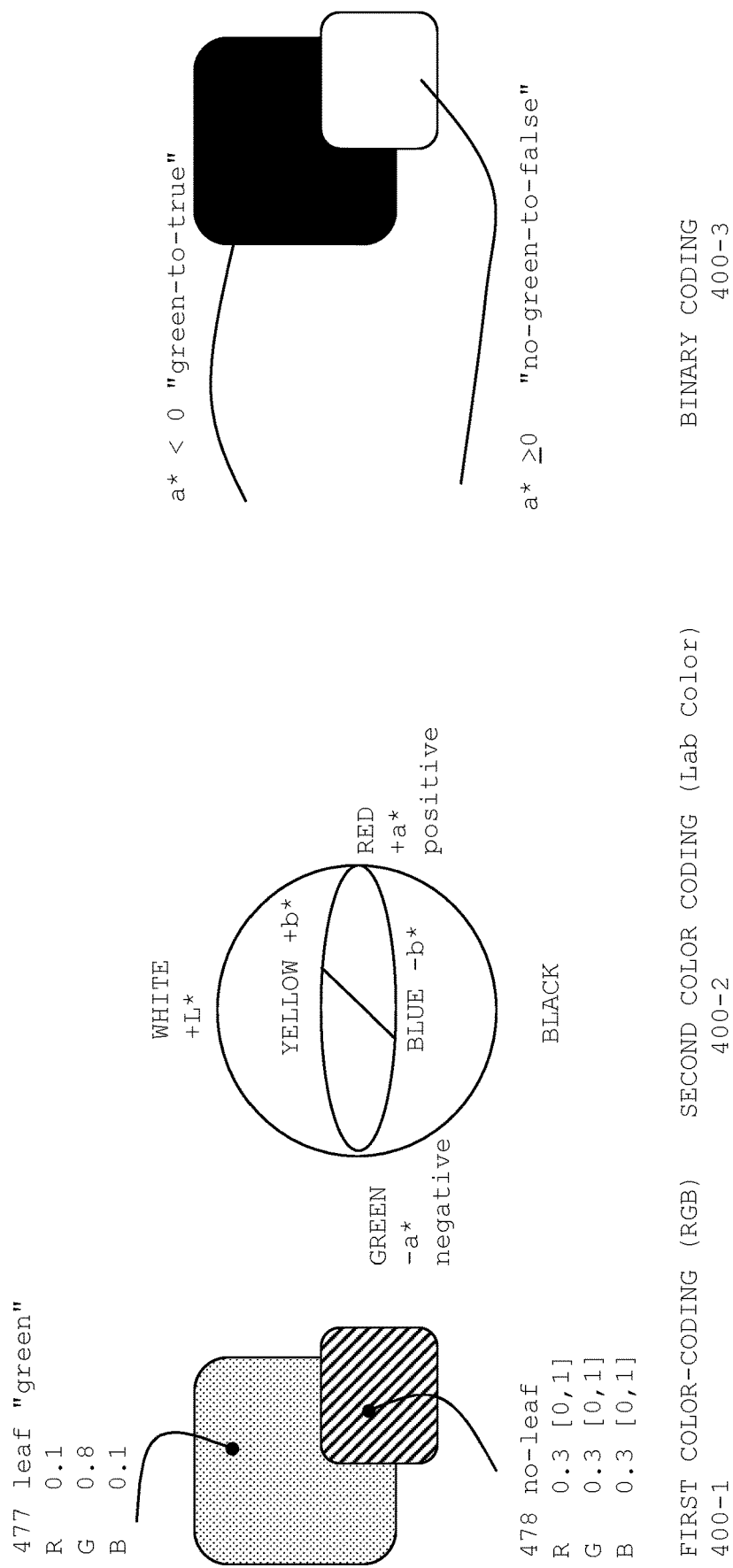
FIG. 8 illustrates the assignment of color-coded pixels to binary values by using color transformation.

Region 477 could be assigned to TRUE, and region 478 could be assigned to FALSE. The figure uses black and white just for illustration. However, differentiating regions on the basis of RGB code may lead to inaccuracies. Further, the computer would have to differentiate colors in 3 components. For a 3D color space (as RGB) the computer would have to apply a differentiator in at least 2D. This constraint can be addressed as explained in the following:

FIG. 8 illustrates the assignment of color-coded pixels to binary values by using color space transformation. Pixel regions 477 and 478 of an image are again coded in first color-coding 400-1. In the example, the RGB values are slightly different to that of FIG. 7, but again, the "green" of the leaf region contrasts over the other color of the no-leaf region.

More in general, the contrast is a contrast between a plant color and a non-plant color. Since for many plants, "green" is the dominant plant color, the use of "green" is convenient for illustration. The color-coding will be transformed to arrive at a color-coding for that plant colors and non-plant colors are separated with minimal computational efforts.

The image is now transformed to a second color-coding in the so-called L*a*b* color space. This space is also referred to as CIELAB. To implement such color space transformation, the person of skill in the art can apply known formulas or can use libraries with computer instructions for image transforming. Such libraries are available for example, in Matlab (mathworks.com), skimage (scikit-image.org), openCV (opencv.org), etc. In the embodiments, transformation was implemented by skimage for python.

Color-coding is well-known in the art, and the L*a*b* space is standardized by the CIE (Commission Internationale de l'Éclairage, International Commission on Illumination, ISO/CIE 11664-4:2019 Colorimetry). In short, the color components define WHITE, BLACK, YELLOW, BLUE, RED and GREEN. The component a* indicates GREEN (if negative) and indicates RED (if zero, or positive).

The assignment of the pixels to binary coding 400-3 depends on the component a*, with "green-to-true" (for a*<0) and "no-green-to-false" (for a*>0). The assignment is arbitrary and the illustration in black for TRUE and white for FALSE is just convenient for illustration. The name of the binary values does not matter.

Using the component a* (of CIELAB) as the color differentiator is advantageous as explained in the following. There is no need for a 2D differentiation any longer.

Observation

Figure 9:
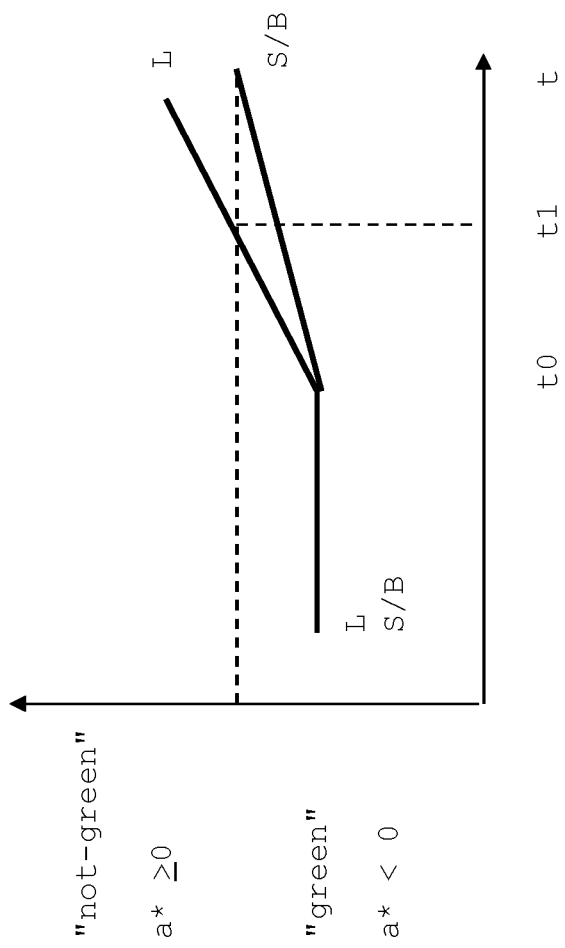
FIG. 9 illustrates the change of color over time, separated for leaves and other parts of the plant.

FIG. 9 illustrates how damage to the plant changes the color of the plant over time, separated for leaves and other parts of the plant.

The effect of non-uniform color change rate has been noted already, and the description explains how the approach takes advantage of that effect.

Much simplified, color is given on the ordinate by the two variants "not-green" (for a*>=0) and "green" (for a*<0).

The progress of time t is given on the abscissa. Before t0, the aerial parts of the plant (i.e., the stem S, the branches B and the leave L have "green" color. Of course, not all parts have the same color (the horizontal graph), but the a* component remains negative.

t0 marks the point in time when damage start to occur (e.g., the arrival of insects that start eating the plant, the arrival of fungi etc.). The color starts to change, this is simplified by the graph rising at different angles for the leaves L and for the stem/branch S/B.

t1 marks the point in time when the color changes for the leaves such that component a* changes its sign (to positive). As the color of the leaves is not the same everywhere on the leaves, some part of the leaves are still "green" and some are already "not-green". However, at t1 the stem S and the branches B are still "green" (the a* component being still negative).

When processing the plant-image, the segmenter module 261/262 differentiates the pixels according to the component a* so that relatively large pixel regions (that correspond to the plant) remain "green".

The damage concentrates on the leaves. The branches (cf. part 140A) are not much affected by the damage. In other words, despite a relatively high foliar damage degree (i.e., damage to the leaves), the branches and the stem may remain green (in color).

Segmenting the Plant-Image by Mask-and-Margin Approach

Figure 10:
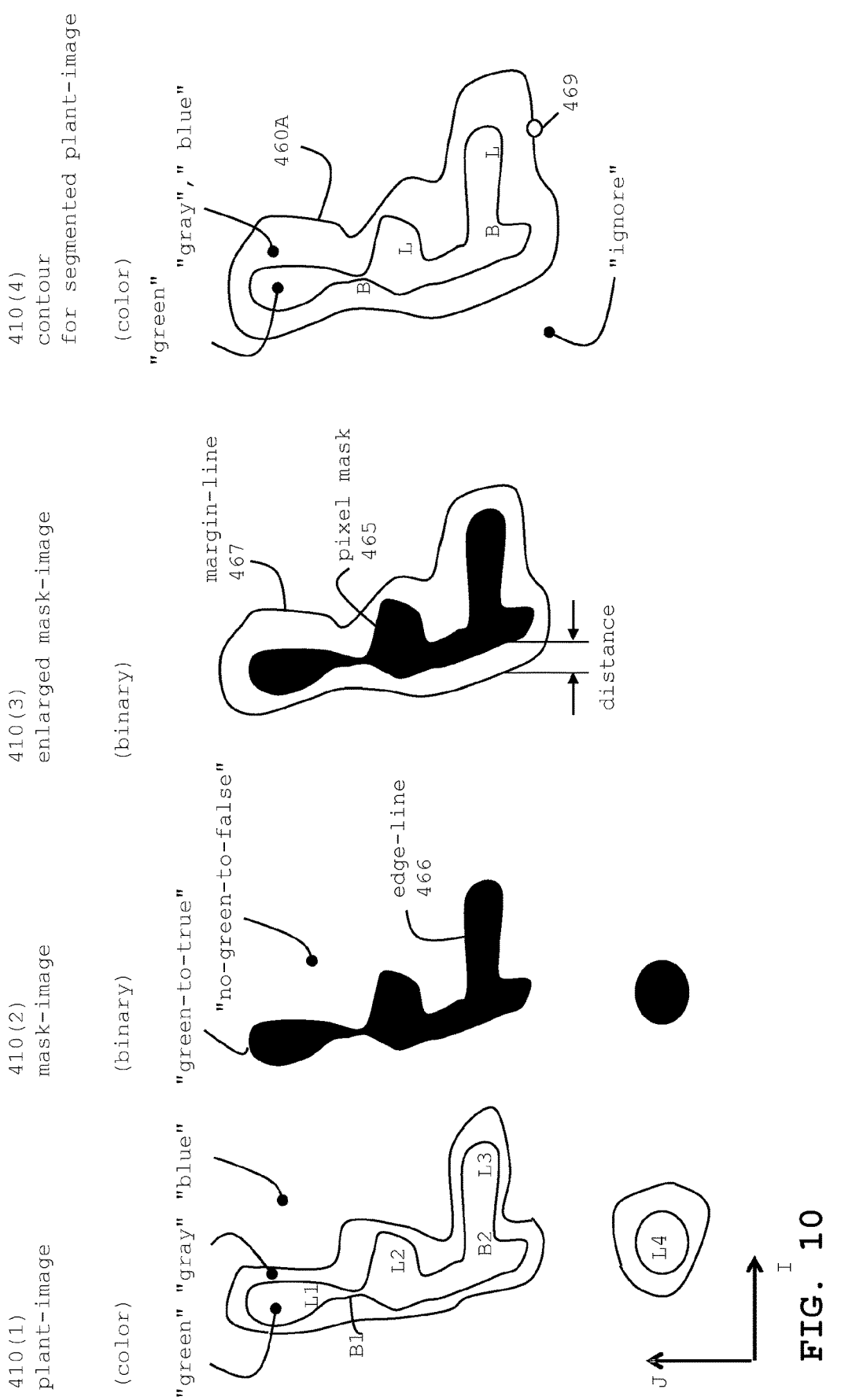
FIG. 10 illustrates processing the plant-image to a segmented plant-image with a contour.

FIG. 10 illustrates an approach to segment plant-image 410 (view from above) into segmented plant-image 460. Segmenting (601B/602B in FIG. 3) is performed by segmenter module 261/262. The module performs segmentation for training 1 and testing phase 2 likewise. According to characteristic images, the approach can be called "mask-and-margin approach".

The approach is illustrated from left to right, with illustrations in a sequence (1) to (4). The images have a size as they are provided by the camera (e.g., 4000 pixels in the I-coordinate, 6000 pixels in the J-coordinate). The exact aspect ratio (I to J) does not matter. The rectangles are not illustrated. The images do not have to be presented to a user, and the illustration of images in this figure merely serves to explain the approach.

Plant-image 410 (1) shows the plant-image (in view from above), with a plant having four regions that are "green": a leaf L1, a branch B1, a leaf L2, a branch B2 and again a leaf L3, similar to the plant-image in FIG. 4. The plant-image also shows a fallen leaf L4, separated from the other regions. The "green" region is surrounded by pixels in other colors, here symbolized as "gray", originating from damages 180 (cf. FIG. 5) and/or from the background. When the plant has no damage or little damage only, the "green" is surrounded by the background color. The background (from ground 150, cf. FIG. 4) should have a color that is not a plant color, here symbolized as "blue". (It can also be "grey" or any other color, cf. the training set explained for FIG. 13).

Segmenter module 261/262 does not know the semantics (stem, branch, leaves, damages, background etc.) and the semantics are mentioned here only for convenience of explanation.

Plant-image 410(1) is coded in the first color-coding (cf. coding 400-1 in FIG. 8, RGB).

Segmenter module 261/262 receives plant-image 410(1), transforms the color-coding color to the second color-coding (cf. coding 400-2 in FIG. 8, L*a*b*), and assigns the binary values. The resulting plant-image 410(2) has pixels in two binary values only, here called "green-to-true" and "no-green-to-false" (illustrated black and white). Image 410(2) can also be called "mask-image".

Shortly referring to the semantics, plant-image 410(2) shows the "green" only. Damages and background have pixels in the "no-green-to-false" value.

Plant-image 410(2) shows contiguous pixel regions. In the example, there is a larger region resulting from the L1-B1-L2-B2-L3 combination, and there is a smaller region resulting from the fallen leave. The person of skill in the art can use an image processing tool to apply so-called morphological operations, such as "fill holes": setting the holes of the larger region to "green". Such operations can accommodate deviations. There may be pixel values that fail the threshold test in a color channel but that are also to be considered as belonging to the plant.

Since damages occur at non-uniform color change rate (cf. FIG. 9), the larger region comprises pixels from the not-yet damaged (still "green") branches and pixels from the not-yet-damaged parts of the leaves. In other words, the larger pixel region is contiguous because the leaves are connected with each other via the branches (and via the stem). Therefore, the larger region originates from a plant (from its aerial part).

The figure illustrates the larger region as a contiguous set of pixels ("green-to-true", here in black). Optionally, any "white" gaps in the larger region can be closed. For example, branch B1 may be damaged so that the relatively small region of "no-green-to-false" pixels would appear, but that gap can be closed, the person of skill in the art can apply morphological operations, such as closing or filling holes.

The larger and the smaller regions form clusters. Since a plant is larger than a leaf, segmenter module 261/262 removes the smaller cluster, in the example the cluster resulting from L4.

The result is a single contiguous cluster of "green-to-true" pixels over a "no-green-to-false" pixels, also called pixel mask 465.

Looking at pixel mask 465, there is a border between the binary values (here called "green-to-true" pixels and the "no-green-to-false"). The border can be defined and detected by simple operations. For example, a "green-to-true" pixel belongs to edge line 466 if a neighboring pixel (j+1, j−1, i−1, or i−1) is a "no-green-to-false" pixel. Other definitions are also possible. It does not matter if edge line 466 belongs to the mask or not.

From pixel mask 465 (plant-image 410(2) in binary coding 400-3, cf. FIG. 8), segmenter module 261/262 cannot determine the damage. Segmenter module 261/26 has to re-cover pixels that are adjacent (that potentially show damage).

Plant-image 410(3) illustrates how the computer draws margin line 467 around the "green" regions. Margin line 467 is derived from edge line 466 according to the following:

(i) The pixels of margin line 467 and the pixels of edge line 466 have a pre-defined minimal distance to each other. The figure illustrates the distance as a distance in the I-pixel-coordinate, but other conventions can be applied as well (e.g., both a minimal distances in I and in J, a minimal distances by the Pythagorean theorem, etc.). Exemplary distances can be 20 pixels, or 30 pixels. It is noted that in implementations, margin line 467 can be identified in iterations, when for example, a one-pixel line is drawn around edge line 467, a further one-pixel line is added and so on.

(ii) The pixels of margin line 467 and the pixels of edge line 466 have a pre-defined maximal distance to each other. In other words, the distances is variable in a tolerance band.

(iii) The pixels of margin line 467 are substantially pixels that (in any color-coding) have a component that corresponds to the background color (e.g., "blue"). The term "substantially" just indicates that the person of skill in the art can apply some tolerance (to accommodate spots). To illustrates this topic, plant-image 410(4) shows spot 469 (for example, an ant sitting on the blue sheet) that the computer would tolerate to be "blue".

As illustrated by plant-images 410(3) and 410(4), pixel mask 465 and margin line 467 define an enlarged set of contiguous pixels. Since the original color-coding of the enlarge set is available (from 410(1)), segmenter module 261/262 replaces the (binary coded) pixels within margin line 467 by the original pixels of plant-image 410 (first color-coding e.g., in RGB).

The resulting contour 460A is the (enlarged) set of contiguous pixels in original color coding. Margin line 467 can be considered as the contour-line. Looking at the semantics, contour 460A comprises pixels in "green" for un-damaged parts of the plant, in "gray" for the damaged parts, and "blue" for some background. The pixels outside contour 460A are to be ignored in further processing. In implementations, these pixels are set to a particular extreme color, such as to black (0, 0, 0).

Technical Considerations

Contour 460A corresponds to segmented plant-image 460. There are some minor technical implementation details that are explained in the following with FIGS. 11-12.

Figure 11:
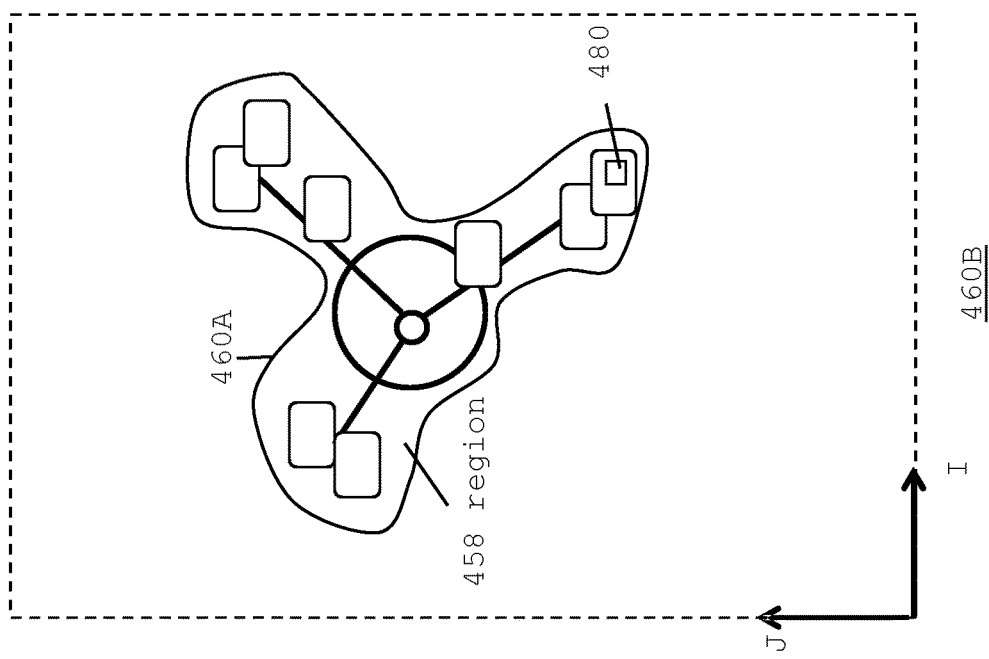
FIG. 11 illustrates the segmented plant-image as provided by a segmenter module.

FIG. 11 illustrates segmented plant-image 460B as provided by segmenter module 261/262. Plant-image 460B is illustrated as if it would have been calculated from image 410 of FIG. 6. The image shows contour 460A. Pixels outside contour 460A are to be ignored, the contour itself and to-be-ignored pixels can be embedded into the segmented plant-image. Within the contour, at least one leaf shows damage 480. Although damage 480 was potentially separated out by color-to-binary processing (cf. FIGS. 10 (1) to (2)), enhancing the mask (cf. FIGS. 10 (3) to (4)) returned the damage back to the image. This explanation is simplified, damage 480 could also have been "green-to-true".

Contour 460A shows margin region 458 that corresponds to ground 450. Since, optionally, ground 150 is covered by sheet 105 (in non-plant color), CNN 261 would not detect damage on that part.

The share of the margin (number of pixels in "blue" to the number of pixels in "green" or other plant color) is relatively small.

Segmenter module 261/262 can provide the number of pixels N_CONTOUR in contour 460A.

This enables CNN 271 to be trained (with the appropriate damage annotations) and enables CNN 272 to provide the damage degree.

During testing phase **2, CNN 272 provides the damage estimation value as fraction values, such as a percentage (from 0 to 100), or as fraction to 1 (from 0 to 1).

It is noted that the logic can be reversed. For example, "damage=20%" has the same meaning to the farmer as "health=80%".

Figure 12:
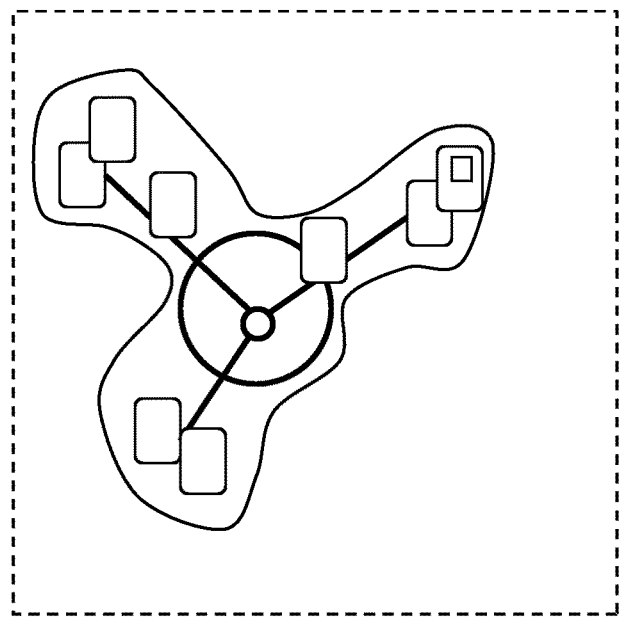
FIG. 12 illustrates the segmented plant-image as provided by the segmenter module in an adaptation for processing by the CNN.
Figure 13:
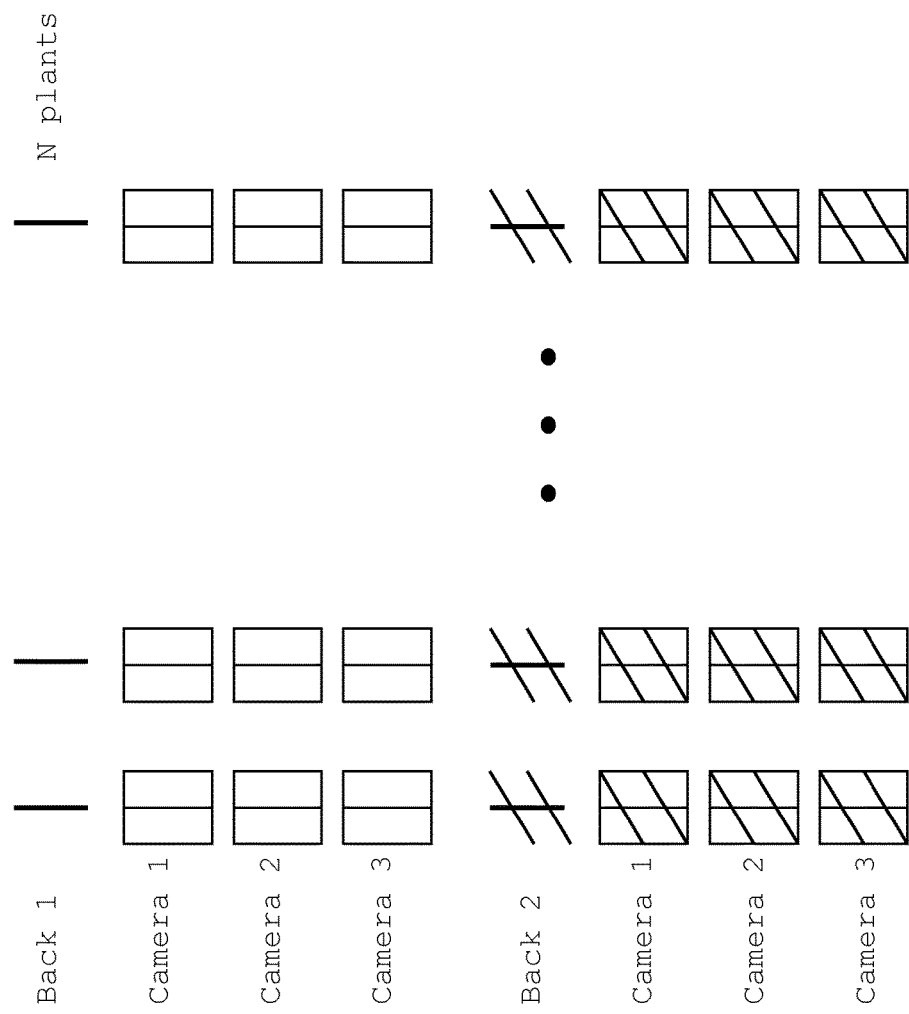
FIG. 13 illustrates—in symbolic images—an image acquisition campaign in a greenhouse to obtain a plurality of plant-images for training purposes.

FIG. 12 illustrates segmented plant-image 460C as provided by segmenter module 261/262 in an adaptation for processing by CNN 271/272.

Since the CNNs are usually adapted to receive input images as squares with a maximum number of pixels, contour image 460B is cut to a square (here by cutting the parts the to-be-neglected pixels). Also, the resolution is reduced. In the example, there are no longer 4000×6000 pixels in image 460B, but 512×512 pixels in image 460C.

Reducing the resolution can also respond to the above-mentioned variation in the camera resolution (especially that of camera 312 in the testing phase).

Training Images

Very briefly, the description turns to the training phase **2.

FIG. 13 illustrates—in symbolic images—an image acquisition campaign in a greenhouse to obtain a plurality of plant-images 411 for training purposes in the second scenario (tomato/*tuta*). This corresponds to step 601A/B in FIG. 3. M=200 plants had been photographed by three different cameras (camera 311, FIG. 1, OLYMPUS 24M, NIKON 20M, SAMSUNG GALAXY A8) and with two different backgrounds (natural background, such as the soil and non-plant background "blue", such as of sheet 105).

Therefore, the set comprises M_PLANT*M_CAMERA *M_BACKGROUND=200*3*2=1.200 images.

The illustration is much simplified, the plants are just illustrated by vertical lines and the backgrounds are illustrated by various patterns.

Plant-images 411 are segmented (by segmenter module 261) as just described.

Real Images

FIG. 14 illustrates photographs being real plant-images. The images are color images, but the presentation is approximated in gray-scale. The images are presented by reference numbers. The photographs do not differentiate between training phase 1 and testing phase 2.

On the left side, the figure illustrates plant-image 410 as it comes from the camera. The background color is the "blue" color of sheet 105 (cf. FIG. 4) On the right side, the figure illustrates segmented plant image 460C as it comes out from segmenter module 261/262. The image shows un-damaged leaves 440 occurring in the upper part and leaves with damage 480 in the lower part. Margin region 458 is visible as well ("blue" in the original)

Computer System

FIG. 15 illustrates an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to computers 201/202 of FIGS. 1-2. Computing device 950 is intended to represent various forms of mobile devices, such as personal digital assistants, cellular telephones, smart phones, and other similar computing devices. For example, computing device 950 may include the data storage components and/or processing components of devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

REFERENCES 105 sheet
110/111/112 plant
118 pot
120 stem
130 branches
140/141/142 leaf
150 ground
181/182 damage
183 shadow
191/192 user
201/202 computer
261/262 segmenter module
271/272 CNN
301 computer
302 mobile device
342 network
292 user interface
310/311/312 camera
400-1, 400-2 color-coding
400-3 binary coding
410/411/412 plant-image
420 stem (on image)
430 branch (on image)
440 leaf (on image)
450 ground (in image)
458 margin region
460 (ABC) segmented plant image
462 segmented plant image
465 pixel mask
466 edge line
467 margin line
469 spot
477, 478 regions
479 color diagram
602B, 702B method
691 annotating
9xx computer with components
XYZ location coordinates
I, J pixel coordinates
N counter for pixels
M counter for training images

The invention claimed is:

1. A computer-implemented method to quantify biotic damage in leaves of crop-plants, the method comprising:
 receiving a plant-image showing a crop-plant, the plant-image showing an aerial part of the crop-plant, with at least a stem, branches, and leaves and showing the ground underneath the plant, on that the plant is placed;
 processing the plant-image to obtain a segmented plant-image being a contiguous set of pixels that shows a contour of the aerial part, the contour having a margin region that shows the ground partially, wherein processing the plant-image to obtain the segmented plant-image comprises:
  changing color-coding of the plant-image from a first color-coding to a second color-coding, by transforming color space, the second color-coding with higher contrast between plant and ground than the first color-coding;
  for the pixels in the second color-coding, differentiating the pixels of the plant-image and assigning the pixels to first and second binary values, thereby obtaining a contiguous set of pixels that are coded in the first binary value;
  identifying edge pixels of the contiguous set, being pixels of the first binary value having at least one adjacent pixel of the second binary value, determining a margin line being a set of pixels in a distance to the edge pixels, wherein the distance is limited by a minimal number of pixels and a maximal number of pixels; and
  replacing the pixels within the margin line by the pixels in the first color-coding; and
 processing the segmented plant-image by a convolutional neural network that uses regression to obtain a damage degree, the convolutional neural network having been trained by processing damage-annotated segmented plant-images.

2. The method according to claim 1, wherein receiving plant-images comprises to receive images from plants in view-from-above zenithal view, the plant-image showing the plant with stem, branches growing from the stem, and multiple leaves growing from the branches, and showing the ground.

3. The method according to claim 2, wherein the plant-image is an image of a plant in a pot, with the pot placed on a sheet or placed on the ground having a surface color that is different from the colors of the plant.

4. The method according to claim 3, wherein the plant-image is an image of the plant in the pot on the sheet having a color selected to have highest contrast to the plant colors, the contrast being a color-space contrast.

5. The method according to claim 1, wherein obtaining a contiguous set of pixels that are coded in the first binary value is performed for at least two contiguous sets, wherein for a predefined maximal distance between the sets, they are combined to a single set.

6. The method according to claim 5, wherein in obtaining a contiguous set, for a predefined maximal distance between the sets, one of the sets is ignored.

7. The method according to claim 1, wherein the convolutional neural network has been trained by processing damage-annotated segmented plant-images, with annotations indicating a damage share.

8. The method according to claim 7, wherein the damage-annotated segmented plant-images are obtained by receiving annotations to segmented-plant-images, wherein the segmented-plant-images are obtained by the following:
 changing the color-coding of the plant-image from a first color-coding to a second color-coding, by transforming the color space, the second color-coding with higher contrast between plant and ground than the first color-coding;
 for the pixels in the second color-coding, differentiating the pixels of the plant-image and assigning the pixels to first and second binary values, thereby obtaining a contiguous set of pixels that are coded in the first binary value;

identifying edge pixels of the contiguous set, being pixels of the first binary value having at least one adjacent pixel of the second binary value, determining a margin line being a set of pixels in a distance to the edge pixels, wherein the distance is limited by a minimal number of pixels and a maximal number of pixels; and replacing the pixels within the margin line by the pixels in the first color-coding.

9. A non-transitory computer-readable medium having instructions encoded thereon that—when loaded into a memory of a computer and being executed by at least one processor of the computer—cause the processor of the computer to perform the computer-implemented method according to claim 1.

10. A computer system adapted to perform the computer-implemented method according to claim 1.

* * * * *